US006925565B2

(12) United States Patent
Black

(10) Patent No.: US 6,925,565 B2
(45) Date of Patent: Aug. 2, 2005

(54) PEN-BASED TRANSPONDER IDENTITY VERIFICATION SYSTEM

(75) Inventor: Gerald R. Black, Southfield, MI (US)

(73) Assignee: Pen-One, Inc, Southfield, MI (US)

( * ) Notice: Subject to any disclaimer, the term of this patent is extended or adjusted under 35 U.S.C. 154(b) by 725 days.

(21) Appl. No.: 09/865,638

(22) Filed: May 25, 2001

(65) Prior Publication Data

US 2002/0178369 A1 Nov. 28, 2002

(51) Int. Cl.[7] ................................................ G06F 11/30
(52) U.S. Cl. ....................... 713/186; 713/176; 713/180; 713/193; 713/200; 713/201
(58) Field of Search ................................. 713/186, 176, 713/180, 182, 193, 200, 201

(56) References Cited

U.S. PATENT DOCUMENTS

| | | | | |
|---|---|---|---|---|
| 5,353,350 A | * | 10/1994 | Unsworth et al. | 713/194 |
| 5,677,955 A | * | 10/1997 | Doggett et al. | 705/76 |
| 5,982,891 A | * | 11/1999 | Ginter et al. | 705/54 |
| 6,128,602 A | * | 10/2000 | Northington et al. | 705/35 |
| 6,164,528 A | * | 12/2000 | Hills et al. | 235/379 |
| 6,193,152 B1 | * | 2/2001 | Fernando et al. | 235/380 |
| 6,237,786 B1 | * | 5/2001 | Ginter et al. | 213/153 |

* cited by examiner

Primary Examiner—Thomas R. Peeso

(57) ABSTRACT

This pen-based, identity verification uses biometric technology. For use in commercial transactions at a point-of-sale terminal, a customer registers advising the system of a customer account that is to be used for payment. The customer also submits a digital signature for reference purposes—a fingerprint. The customer is then issued a transponder that links the customer to the customer account and to the reference digital signature. When the customer is at the point-of-sale terminal for making payment, an interrogator disposed at the point-of-sale terminal transmits a radio signal requesting identity verification. The transponder submits data to the interrogator. Thereafter, when the customer uses a stylus to submit written data (a signature), a sensor in the stylus makes incidental capture of biometric data that enables the interrogator to confirm customer identity. Similarly, at a security checkpoint in an office building, the system is utilized when a written log is used to track access and egress to the building. Again, a transponder is issued to a party having authorized access after the party has registered and submitted a digital signature for reference purposes.

33 Claims, 15 Drawing Sheets

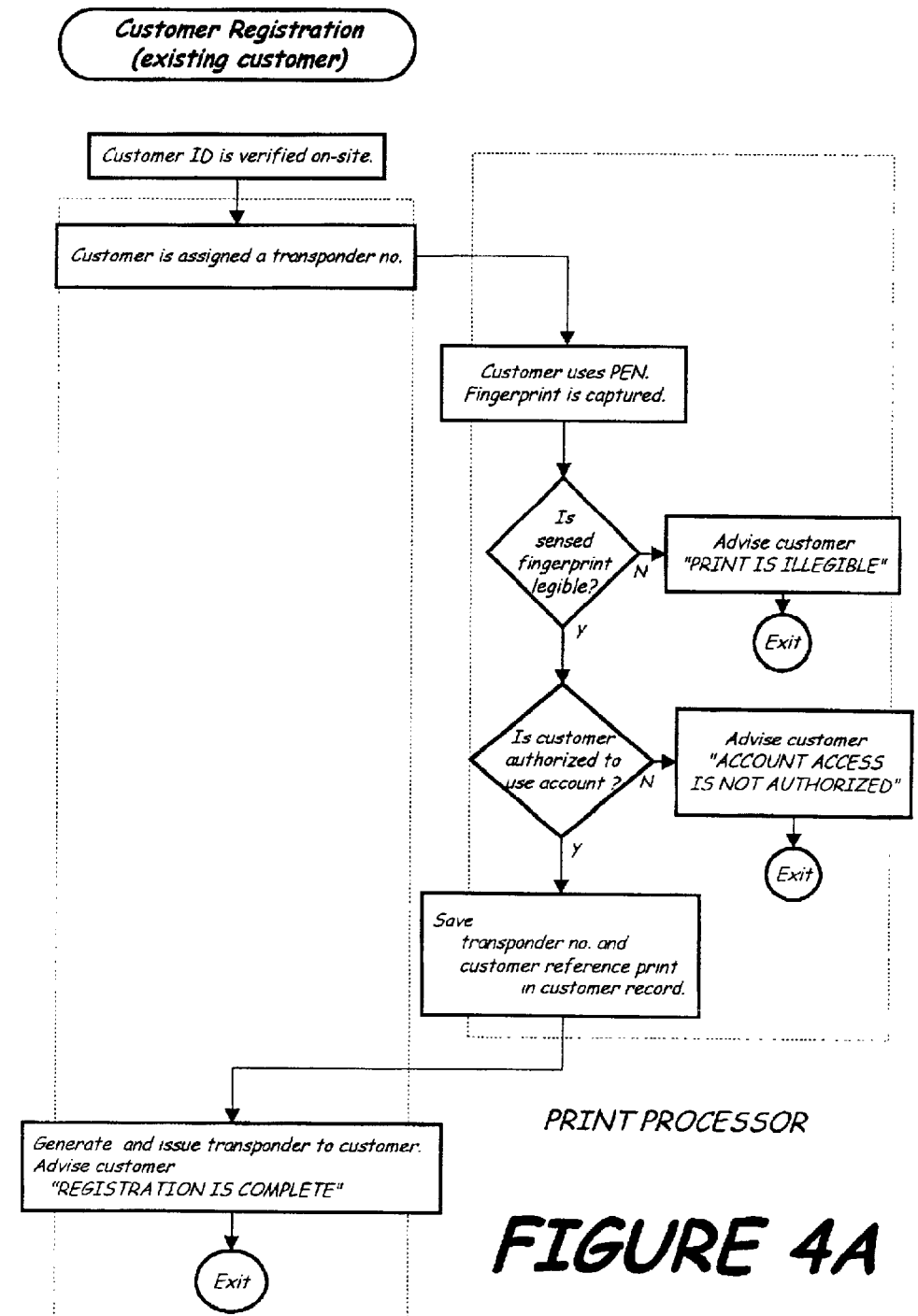

| TRANSPONDER NO. |
|---|
| CUSTOMER BANK |
| CUSTOMER ACCOUNT NO. |
| REFERENCE PRINT |

FIGURE 5A

| TRANSPONDER NO. |
|---|
| CUSTOMER ACCT. NO. |
| CUSTOMER BANK |

FIGURE 5B

| TRANSPONDER NO. |
|---|
| CUSTOMER NAME |
| ADDRESS |
| PHONE NUMBER |
| ACCOUNT BALANCE |

FIGURE 6A

| TRANSPONDER NO. |
|---|
| CUSTOMER NAME |
| ADDRESS |
| PHONE NUMBER |
| ACCOUNT BALANCE |
| REFERENCE PRINT |

FIGURE 6B

FIGURE 9C
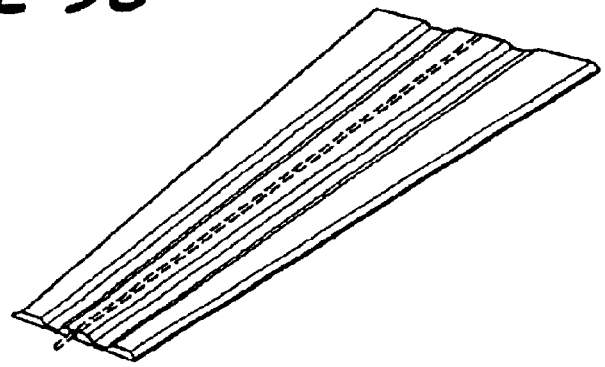
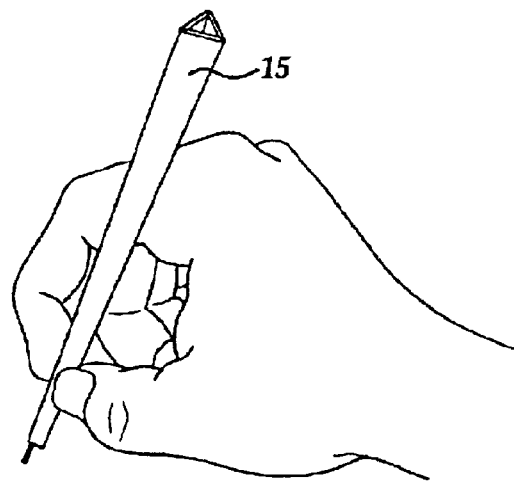
FIGURE 9D

PEN-BASED TRANSPONDER IDENTITY VERIFICATION SYSTEM

FIELD OF THE INVENTION

The invention relates generally to various systems for verifying the identification of a person, and more particularly, where the person carries a radio-frequency identifier for use at point-of-sale terminals, and similar sites where a writing is used to either conduct a transaction or keep a written log of activities.

BACKGROUND OF THE INVENTION

Many identification systems are known in the art. In some cases, a photograph of a subject or his fingerprint pattern is affixed to an identification card. In other approaches, various methods are employed for storing image or password information in a magnetic stripe or in an optically encoded image or pattern, which is physically part of the identification card. Still other approaches utilize a "smart card" having its own semiconductor memory capability for information storage.

U.S. Pat. No. 6,175,922 (Wang) discloses an electronic transaction system for completing a transaction request at a point-of-sale terminal using a portable electronic authorization device carried by a user. The device first receives digital data representing the transaction request. The electronic authorization device provides information to the user regarding an ability to approve the transaction request. When the user approves the transaction, the electronic authorization device receives additional data representing the electronic service authorization token.

U.S. Pat. No. 6,140,939 (Flick) discloses a biometric characteristic verification vehicle control system. The control system includes a controller for learning a unique biometric characteristic of an individual to define a learned individual capable of causing performance of a function associated with the vehicle. The vehicle function control system includes a biometric characteristic sensor, and a controller at the vehicle for controlling a vehicle function responsive to the biometric characteristic sensor.

U.S. Pat. No. 5,857,152 (Everett) discloses an electronic toll payment system for toll payment by electronic cash. The system identifies an electronic purse and effects value transfer over a communication system without the need for the vehicle to stop. The system provides for toll payment by use of a communication device and an electronic purse coupled to the device. The electronic purse is part of an electronic cash system. The remote communication system communicates with mobile devices to effect toll payments by exchanging cryptographically secure messages.

U.S. Pat. No. 5,706,349 (Aditham et al.) discloses a system for authenticating remote users in a distributed environment. A token is initially issued to a remote user once a security mechanism initially can determine that the remote user is who he claims to be. Thereafter, a connection between a remote user and an application server requires the application server to first verify that a token associated with a connection request was issued by the security mechanism. If the token associated with the connection call was issued by the security mechanism, the remote user is connected to the application server.

U.S. Pat. No. 6,202,055 (Houvener, et al.) discloses a system for processing a financial instrument other than cash. A customer at a point of identification terminal initially submits the instrument—perhaps a check. The checking account number is communicated to a remote database containing digital photographic images of authorized users of checking accounts. The remote database is searched and any digital photographic images associated with the checking account number are transmitted to the point of identification terminal. The images are displayed and compared to the physical appearance of the customer. The on-site employee then submits determines if at least one of the displayed digital matches the appearance of the person initiating the transaction. The transaction data is then stored as a transaction record.

U.S. Pat. No. 5,903,225 (Schmitt, et at.) discloses an access control system with fingerprint sensor enrollment. The system includes a station for enrolling a person as authorized based upon the sensed fingerprint. The system also includes an access-triggering device that is carried by the authorized person, and an access controller for granting access to an authorized person bearing the access-triggering device. The access-triggering device cooperates with the enrolling station to store data for an authorized person based upon the sensed fingerprint. The controller grants access responsive to the wireless transmitter being in proximity to the wireless receiver. The authorized person bearing the access trigger device is unobtrusively granted access merely by approaching the access location.

U.S. Pat. No. 5,973,731 (Schwab) discloses an identification system that provides interactive communication of text and image information between a central server and multiple remote terminals. The central server maintains a separate, centralized database of data-compressed images of the subject individuals, and subsequently transmits the data-compressed images to local terminals, on demand, during the transaction. The central server independently manages both image and textual data to ensure that all information is independently retrieved. The image may include a copy of the authorized signature, which then is used by the transaction terminal to compare to a scanned image of the signature on the authorization slip. Upon a request from a transaction terminal, textual and associated image data are recalled for review.

While a written signature is still regarded as the preferred way for a person to convey approval and a legal commitment, there still remains a need to confirm absolutely that can assure that the person signing is the person authorized to make a commitment.

What is needed is a system that will utilize transponder technology (primarily) in commercial transactions of any value that is acceptable to all parties—that captures a digital signature (which is the international standard of identification) at the same time that the electronic signature (the written text) is captured, the combined signature being irrefutable; a pen-based system that is both compatible with card-based systems and independent of such systems; and a pen-based system that provides security in building access and enables data access and data entry upon positive identity verification.

SUMMARY OF THE INVENTION

The system of the present invention addresses these needs. A first preferred embodiment of the identity verification system of the present invention is for use in commercial transactions. The system comprises a host computer, an interrogation device, a transponder device, and a stylus.

The host computer has access to data that links the customer with the customer's payment account. The interrogator is linked to the host computer disposed at the point-of-sale terminal. The transponder is wireless and is carried by the customer, and transmits data to the interrogator upon request. The data transmitted pertains to the identity of the customer. The stylus is attached to the point-of-sale terminal and includes a sensor disposed in the stylus grip. The sensor captures a digital signature of the customer while the customer signs her name. Access to the customer's payment account is only enabled when the sensed digital signature matches a reference digital signature.

For use in commercial transactions at a point-of-sale terminal, a customer registers selecting a customer account that is to be used for payment. The customer also submits a digital signature for reference purposes—preferably, a fingerprint. The customer is then issued a transponder that links the customer to the customer account and to the reference digital signature. When the customer is at the point-of-sale terminal for making payment, an interrogator disposed at the point-of-sale terminal transmits a radio signal requesting identity verification. The wireless transponder submits data to the interrogator. Thereafter, when the customer uses a stylus to submit written data (such as a signature), a sensor in the stylus makes incidental capture of biometric data that enables the interrogator to confirm customer identity. Similarly, the system can be used to confirm identity when the customer wants to cash a personal check.

In another embodiment of the system of the present invention, the system is used to control access to a secure area. At a security checkpoint proximate to the secure area, a handwritten log is used to track access and egress to the secure area. Again, a transponder is issued to a party having authorized access after the party has registered and submitted a digital signature for reference purposes.

Positioned at the center of the process is a stylus with any of a number of biometric or with one or more metric sensors, that enable an incidental capture of data relative to identity verification while the stylus is being used. The identity verification processes of the present invention can be used at POS terminals, in various controlled environments, to access a computer network, in applications involving pen-based computers and smart-pens, for e-commerce, conventional writing implements, and multi-purpose writing implements.

While the systems set forth herein are described in conjunction with POS terminals for purposes of illustration, it is understood that the principles set forth herein are all applicable to a broad range of other activities where a writing or signature are required or preferred, such as Internet and Intranet commerce, access control, government activities (voting, drivers' registration, receipt of government benefits) and for use in controlled environments (such as hospitals, and banks).

PCT Application No. PCT/US99/17900 entitled "Identification Confirmation System" filed on Apr. 7, 1999; U.S. patent application Ser. No. 09/490,687, entitled "Writing Implement and Identity Verification Systems" filed on Jan. 24, 2000; U.S. patent application Ser. No. 09/535,411, entitled "Method for Identity Verification" filed on Mar. 20, 2000; and PCT Application No. PCT/US00/19652 entitled "Identity Authentication System and Method" filed Jul. 18, 2000 by the applicant disclose various systems and configurations for identity authentication using a combination of pen-based and card-based systems. As depicted herein, the systems include a card, a stylus including one or more fingerprint sensors for use with a signature pad. In one embodiment, the system comprises a stylus, a card with enhanced storage capacity, and a signature pad.

The identity verification systems of the present invention are variations of such systems and comprise a host computer, an interrogator, a wireless device carried by the user, and a stylus with at least one sensor that captures biometric properties of the user.

The interrogator is in digital communication with a host computer—the interrogator being disposed at a POS terminal or security checkpoint. The wireless device is preferably a transponder. The stylus can be attached to a POS terminal or a security checkpoint, via a pen-based computer or a signature pad. A digital signature, such as a fingerprint, is captured during a registration process and stored in a file associated with the registrant or in the wireless device.

The stylus includes one or more fingerprint sensor that captures an image of a finger of the customer when the stylus is grasped. While fingerprint sensors are used herein for purposes of illustration it is expressly understood that the principles of this invention are also applicable to sensing of DNA and other biotech properties—that involve cell capture or cell analysis sensors. During routine usage of the stylus, the sensor captures the data necessary to compare with the digital signature to determine identity verification.

As used herein unless the context indicates otherwise, a "stylus" is any device that is compatible with either the hand or finger of the user for purposes of making a marking on an essentially flat surface. The flat surface may be a digital surface or a piece of paper. While the drawings depict a conventional shape of a stylus, other shapes and designs are also included within the scope of the present invention such as any attachment or thimble-like device for a finger or any implement that can be held with a hand for such purpose. The stylus may or may not include an ink cartridge. Also, as used herein unless the context suggests otherwise, the term "fingerprint" refers to either the print of the thumb, index finger, or any other finger.

For a more complete understanding of the pen-based transponder identity verification systems of the present invention, reference is made to the following detailed description and accompanying drawings in which the presently preferred embodiments of the invention are shown by way of example. As the invention may be embodied in many forms without departing from spirit of essential characteristics thereof, it is expressly understood that the drawings are for purposes of illustration and description only, and are not intended as a definition of the limits of the invention. Throughout the description, like reference numbers refer to the same component throughout the several views.

BRIEF DESCRIPTION OF THE DRAWINGS

FIG. 4A discloses a simplified logic diagram for another method of registering an existing customer having a conventional bank account into a second embodiment of the pen-based identity verification system of the present invention as shown in FIG. 1A, 1B, or 1C, utilizing a registration processor, and a print processor for providing improved protection for access to fingerprint data of the customer;

FIG. 5A discloses data including the reference print that may be included in the transponder carried by the customer for the identity verification system of the present invention;

FIG. 5B discloses data that may be included in the transponder carried by the customer, where the reference print is not included in the transponder data but rather the customer record for the identity verification system of the present invention;

FIG. 6A discloses a simplified customer bank record for use with the transponder data of FIG. 5A for the identity verification system of the present invention;

FIG. 6B discloses a simplified customer bank record for use with the transponder data of FIG. 5B for the identity verification system of the present invention;

FIGS. 9C and 9D disclose a second preferred embodiment of a stylus for use with the identity authentication system of the present invention, the stylus being unfoldable into a card-shaped device that includes a magnetic stripe that can be read by a conventional card reader, the device being compatible for carrying in the wallet of a customer;

DETAILED DESCRIPTION OF THE PREFERRED EMBODIMENTS

Figure 1A:
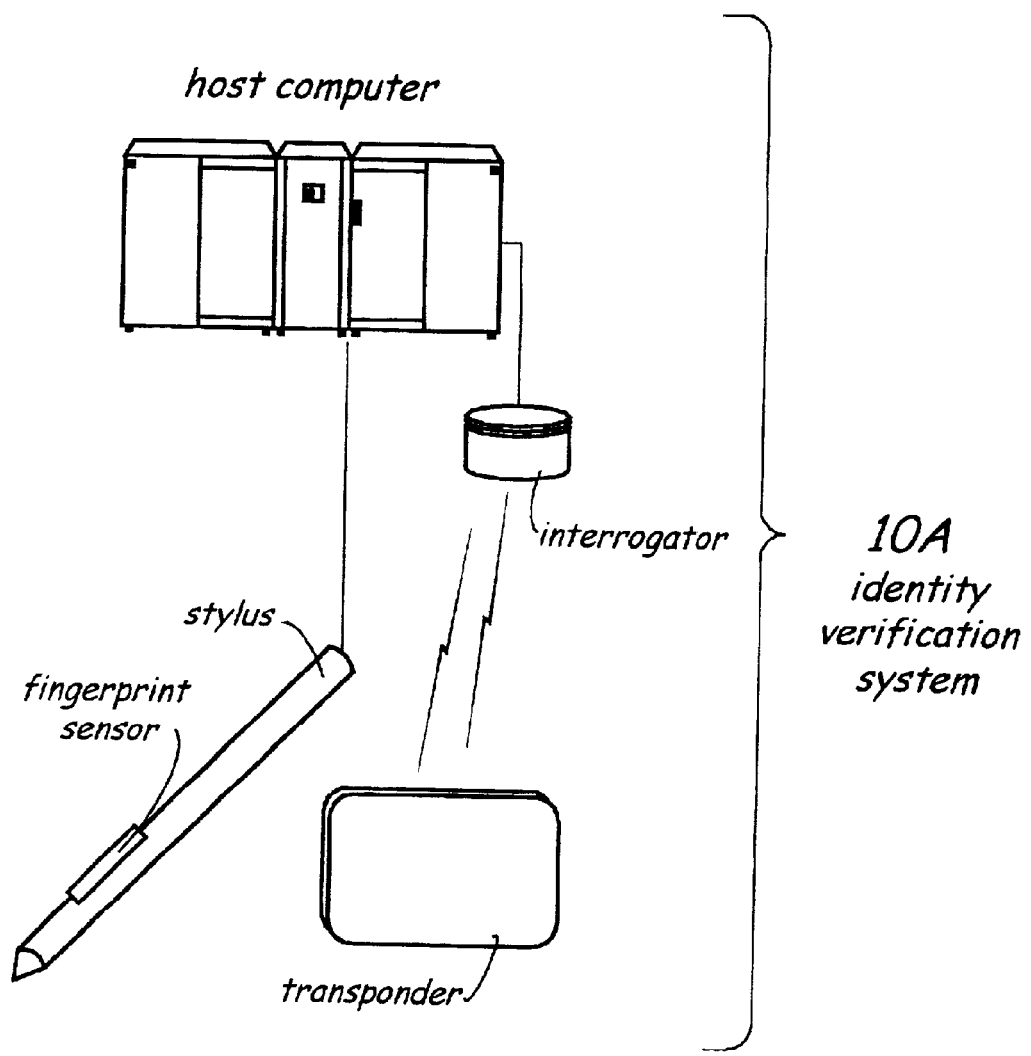
FIG. 1A discloses the identity authentication system of the present invention, comprising a wireless transponder, an interrogator, a stylus, and a host computer.

Referring now to the drawings, FIG. 1A discloses generally the identity verification system of the present invention. The system comprises a host computer, an interrogation device, a transponder device, and a stylus. Each system also comprises a host computer, a sensor positioned within a stylus used to generate a writing on a surface, an interrogator, and a wireless identifier (hereinafter referred to as a "transponder").

The preferred embodiment of the identity verification system of the present invention is for use in commercial transactions. The host computer has access to data that links the customer with the customer's payment account. The interrogator is linked to the host computer disposed at the point-of-sale terminal. The transponder is wireless and is carried by the customer, and transmits data to the interrogator upon request. The data transmitted pertains to the identity of the customer. The stylus is attached to the point-of-sale terminal and includes a sensor disposed in the stylus grip. The sensor captures a digital signature of the customer while the customer signs his name. Access to the customer's payment account is only enabled when the sensed digital signature matches a reference digital signature.

As used herein a "transponder" is a wireless device that is a receiver-transmitter—the device wilt generate a reply signal when a predefined signal is received. The transponder is carried by the customer and includes reference code embedded there—a card, a keytag, some other device that can be conveniently carried in a purse, wallet, keychain, or pocket. The transponder may be active or passive. The transponder can be part of a car key, a driver's license, or perhaps even a smart card.

Figure 2A:
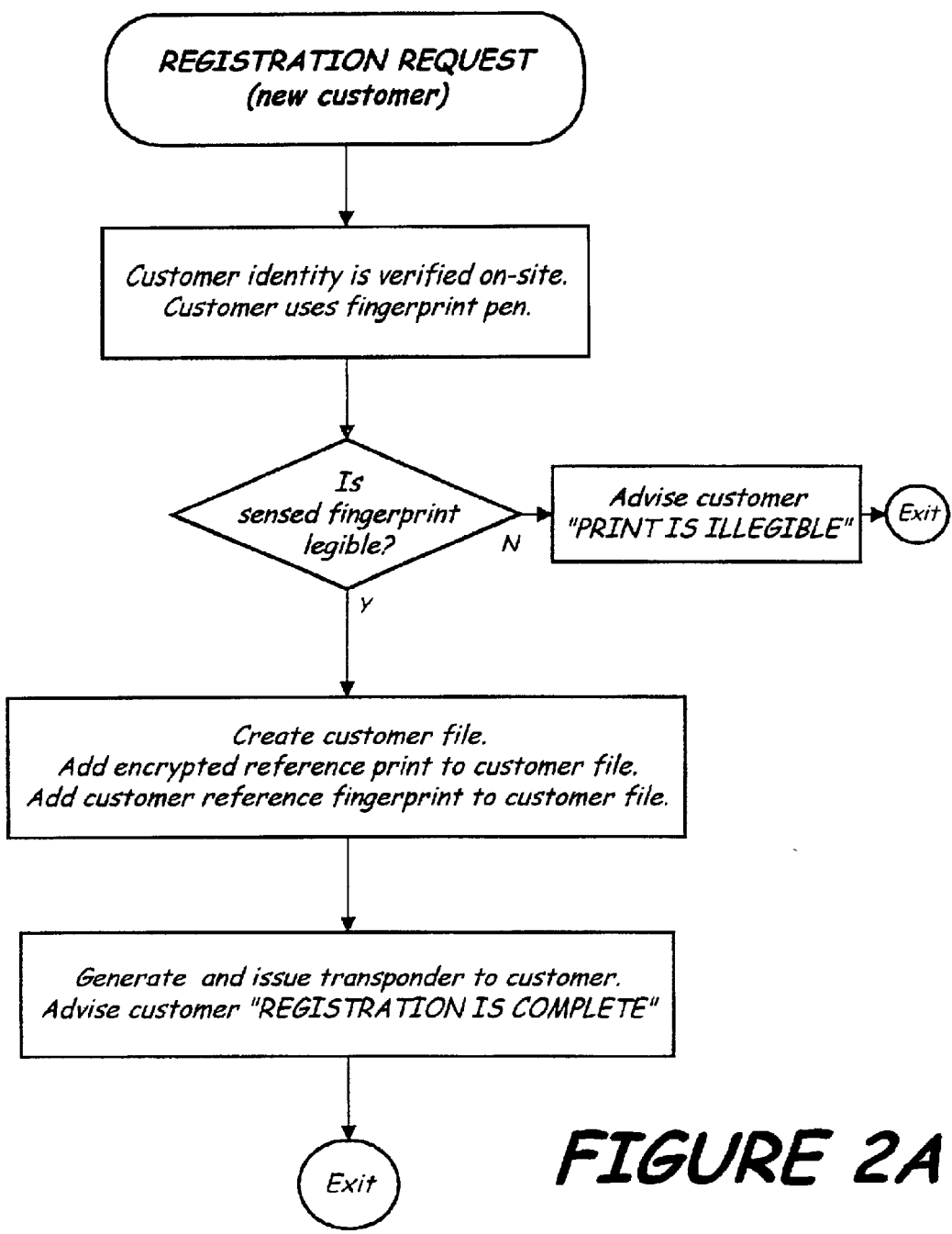
FIG. 2A discloses a simplified logic diagram of a method of enrolling new customers into the identity authentication system of FIGS. 1A, 1B, or 1C.
Figure 2B:
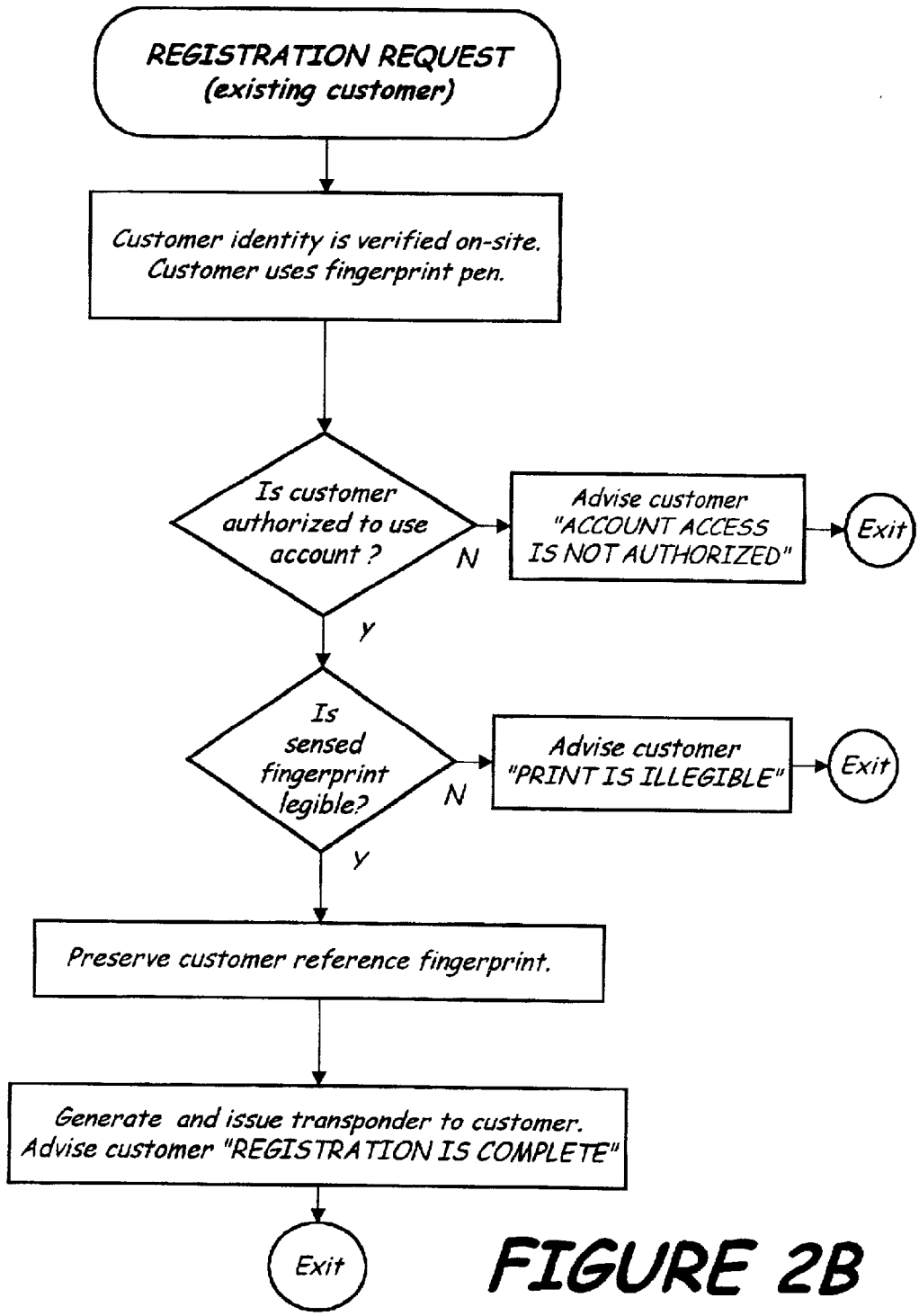
FIG. 2B discloses a simplified logic diagram of a method of enrolling existing customers into the identity authentication system of FIGS. 1A, 1B, or 1C.

FIGS. 2A and 2B disclose simplified methods for registration for new and existing customers, respectively. The primary difference in the two methods is that for the new customer, the customer record must be created. For the existing customer, the customer record is already in existence but a confirmation check is needed to confirm that the customer has authorized access to the account.

The stylus can be attached to a POS terminal, attached to a pen-based computer, or a signature pad. In addition, the stylus can be wireless, whereby the transponder is incorporated into the wireless stylus (see FIGS. 1B and 1C). Each stylus also includes one or more fingerprint sensors that capture an image of a finger of the customer when the stylus is grasped.

Figure 3:
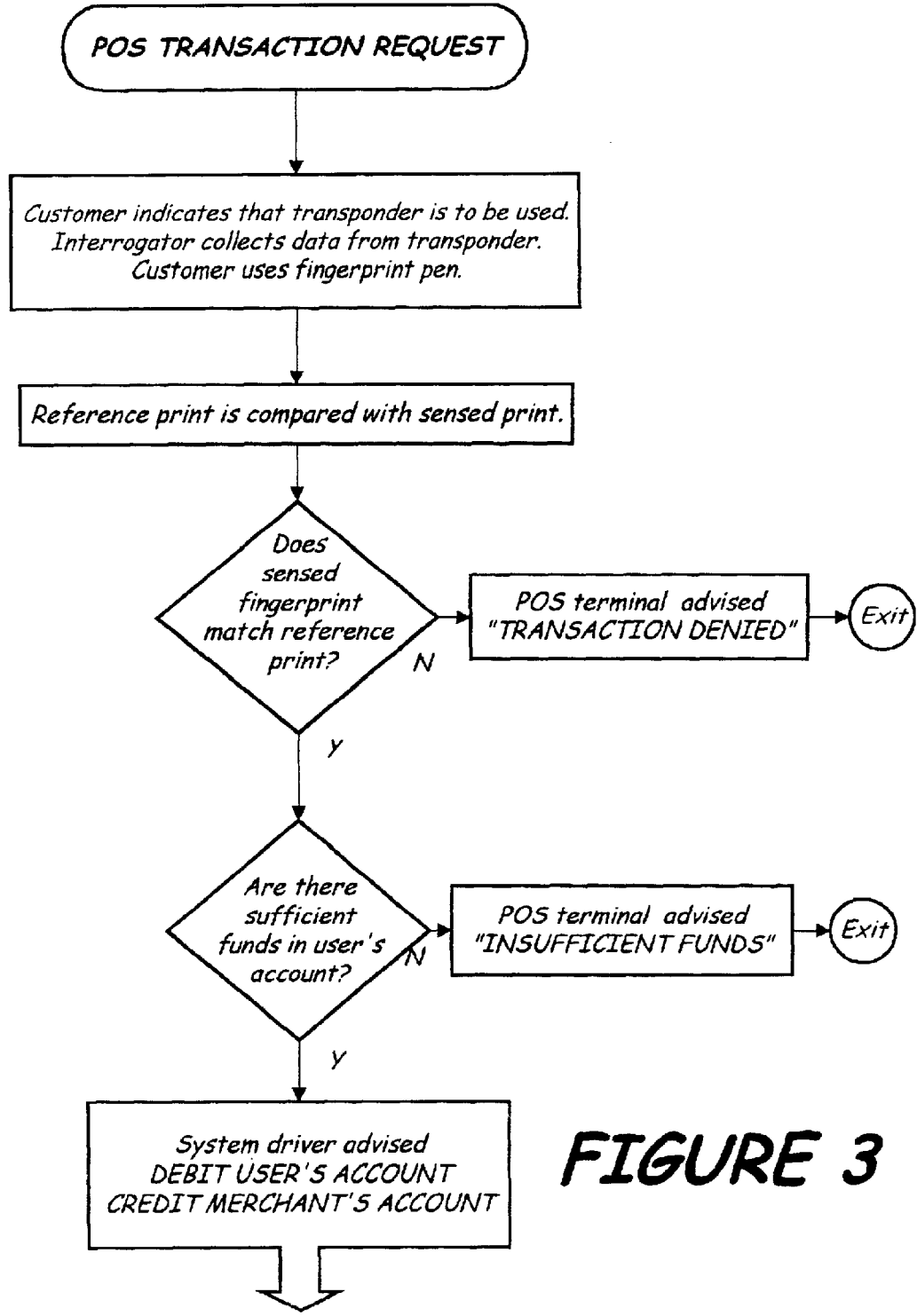
FIG. 3 discloses a simplified logic diagram for one method of making a purchase at a POS terminal using the wireless customer identity verification system of FIG. 5.
Figure 4B:
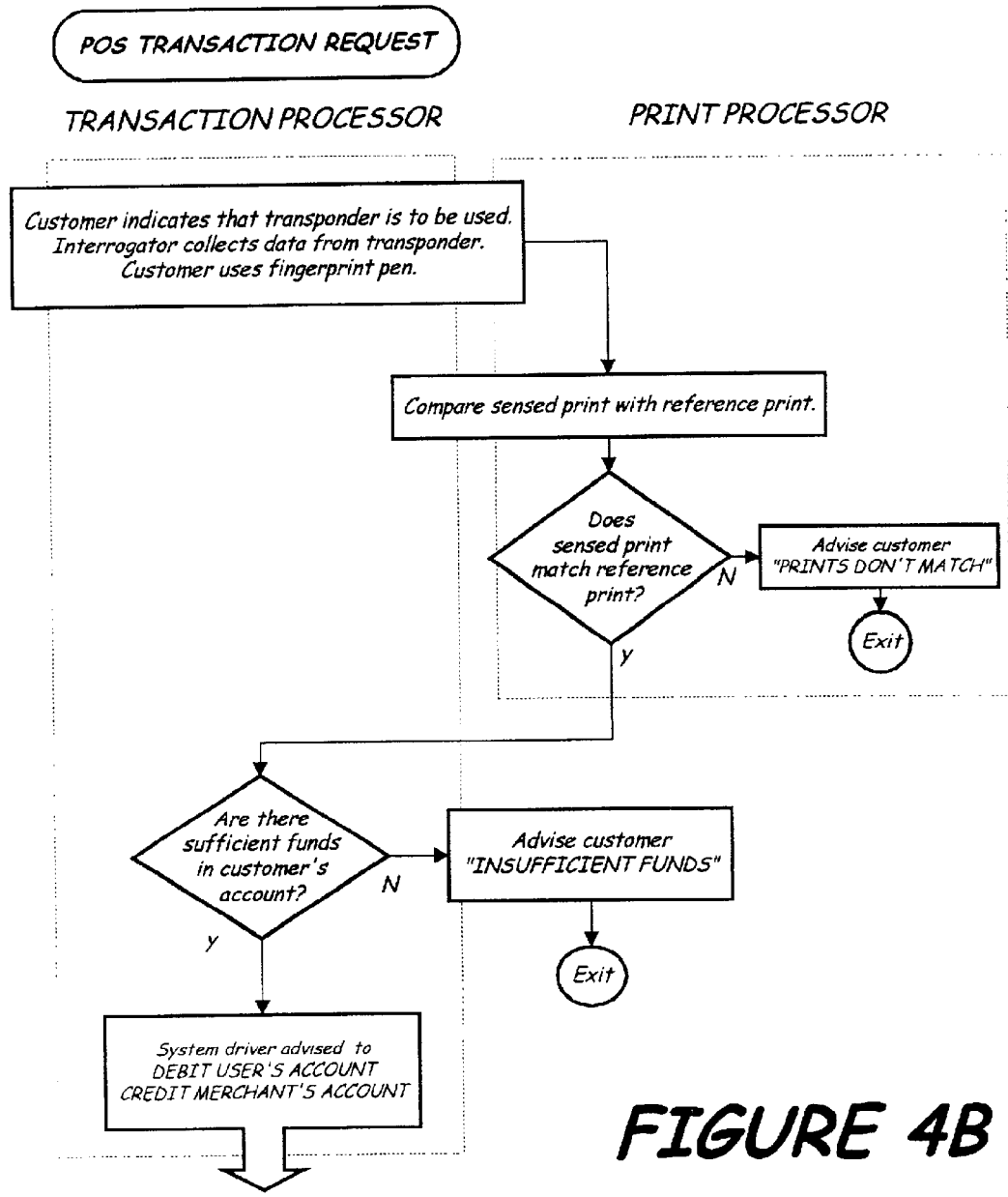
FIG. 4B discloses a simplified logic diagram for another method of processing a commercial transaction at a POS terminal for the pen-based identity verification system of the present invention as shown in FIGS. 1A, 1B, or 1C, utilizing a registration processor, and a print processor for providing improved protection for access to fingerprint data of the customer (similar to FIG. 4A)
Figure 7:
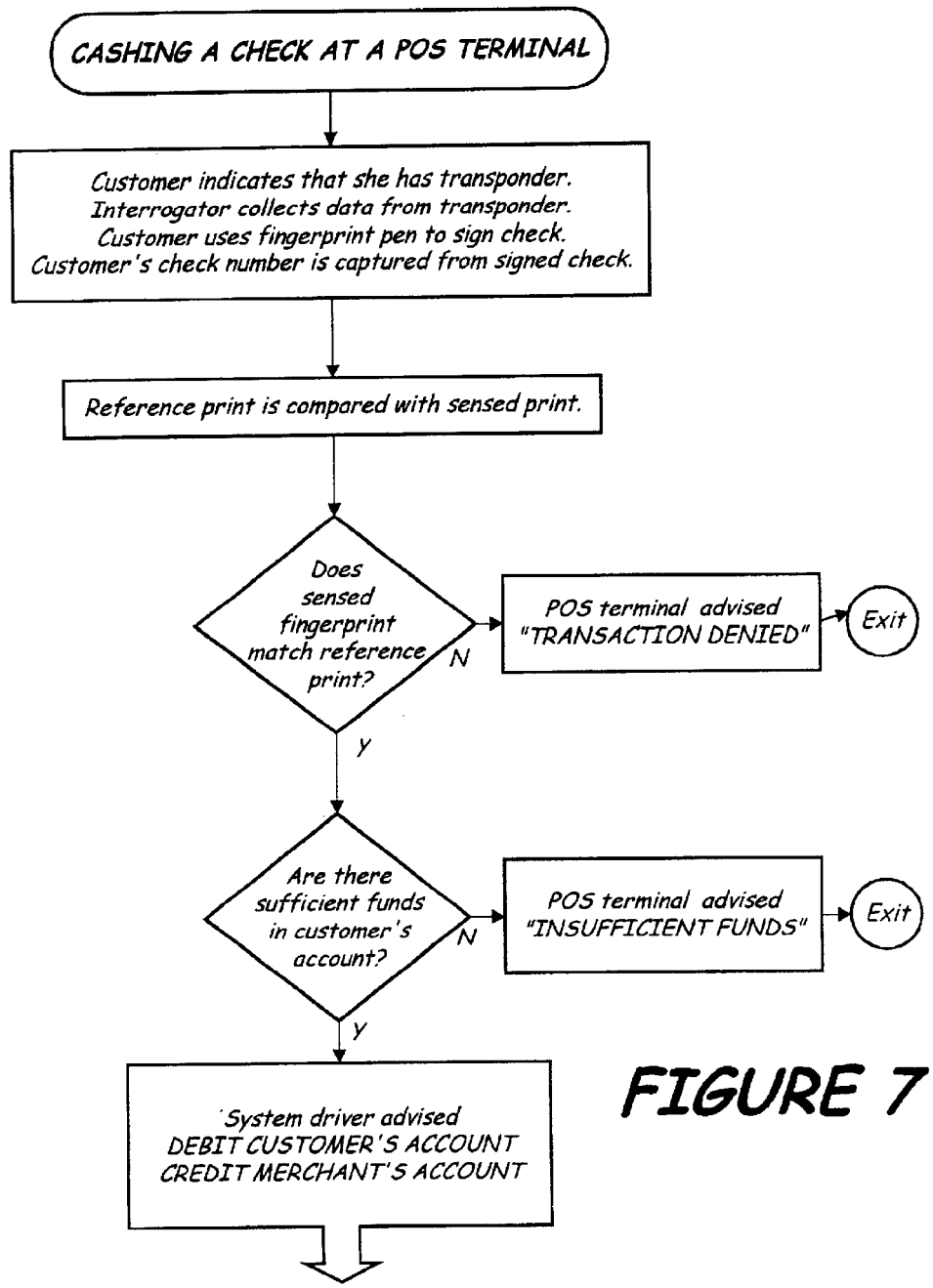
FIG. 7 discloses a simplified block diagram for using the identity verification system of the present invention as shown in FIG. 1A, 1B, or 1C for confirming identity for cashing checks at a POS terminal.

The transponder responds to a radio signal by emitting its own radio signal. Each transponder is tagged with a unique serial number. That serial number can be linked with a credit or debit account. A typical sale may proceed as follows (see FIG. 3). The customer selects goods and proceeds to a POS terminal. The POS terminal indicates that the transaction will be paid through a transponder. An interrogator disposed at the POS terminal collects data from the transponder. A light advises the customer that the payment has been accepted. Payment is made instantly from the customer's registered account.

In one preferred embodiment, the transponder has enhanced memory (akin to a smart card), in which case the encrypted reference fingerprint is stored within the transponder memory as shown in FIG. 5A. Also, the memory may contain account number, balance—and customer data to be stored in the transponder memory. FIG. 6A discloses the corresponding customer bank record. The comparison of the sensed print with the reference print for purposes of identity authentication preferably occurs in the transponder. One significant advantage to this system is that the complete transaction can be completed at the POS terminal with minimal access/input from the driver. Another advantage is that the driver and account data are updated after the transaction is completed In another preferred embodiment, the transponder has limited memory (akin to a magnetic stripe). The writing device is a tethered stylus attached to the POS terminal and the reference print is stored in the customer record. The customer bank and account number are in the transponder (see FIG. 5B). The reference print is in the customer record at the customer bank (see FIG. 6B). The comparison of the sensed print with the reference print for purposes of identity authentication preferably occurs either in the driver (where the sensed print is transmitted) or in the POS terminal (where the reference print is transmitted). In a variation of this embodiment, the transponder has an index reference to the customer bank and account number. For increased security the index reference number in the account index and on the transponder change with each transaction. The reference print is in the customer record at the customer bank. One significant advantage is that since there is minimal information on the transponder device, if the transponder is lost or stolen it is of little use to thieves and hacks. While they can locate the customer's bank and account number (which they can learn from a personal check), they cannot gain access to such funds since the fingerprints don't match. Another advantage is that the transmission of data is through wired connections (more secure).

A passive transponder (does not include a power supply) carried by the customer on his/her person is disposed in a card carried in a wallet or on a keychain—it may need to be removed and swiped through a cardreader or a near an interrogator. An active transponder (includes a power supply) can also be pda, jewelry, glasses, clothing, or the like.

Another preferred embodiment of the identity verification system of the present invention is depicted in FIGS. 6A and 6B. For example in a branch office of a bank—a controlled environment, the pens of the present invention are placed at all tellers' windows, all ATM, and all officers' desks. New customers are given a debit/check/ATM card upon filling out an application. The customer uses a pen similar to the pens at the tellers' windows. The customer's reference print is captured during registration, preferably within a branch office of the bank and electronic fingerprint image that is encrypted is stored in the customer's bank record. Such cards can actually be issued and distributed to customers once registration is completed, much the same as hotels use to issue room keys upon registration—the cards are pre-printed and certain data is loaded onto the card prior to issuance. FIG. 6C depicts a simplified logic diagram for using the system of FIGS. 6A and 6B at a POS terminal.

A transponder is commercially available from AMSKAN of Mulgrave, Victoria in Australia—the InfraRed Datalink allows serial "through the windscreen" data transfer between a vehicle and the roadside in daylight with high reliability and is presently used for capturing information from vehicles as they re-fuel, re-load, or at highway speeds. The IRD is comprised of two main components, the interrogator and the wireless transponder. The interrogator is mounted either at the POS terminal or at the security checkpoint. The size of the transponder is 130×80×50 mm.

Miotec's mPollux client is developed on a SIM card and its integrated security solutions offer a flexible and secure platform with a sufficient capacity for a wireless PKI system. The SIM platform is a FLASH microcontroller, which has a separate RISC processor for RSA operations. MioCOS operating system is compliant with both GSM and PKI standards. Furthermore, the integrated biometric functions enable, among other things, replacing the PIN code in an electronic ID card with fingerprint matching.

In still yet another preferred embodiment of the pen-based verification systems of the present invention, a transponder is used in a smart card. The smart is compatible with both contactless and contact transactions. Such a card is presently commercially available and known as a "Digital Pusan Card." The Digital Pusan Card is one of the first to combine contact and contactless smart card functionality on a single chip. Supporting a wide array of services, it combines credit, debit and prepaid card functions. Compatible with smart pagers the card is used within the existing Hanaro Transportation scheme. Approximately 3,000 buses, 1,000 subway stations and 13,000 taxis are currently equipped with MIFARE®-based contactless readers and car travelers can benefit from 30 toll gates with contactless readers, as well as two parking facilities. Users can access 300,000 readers and 20,000 points of sate, as well as another 40,000 automatic vending machines. Cardholders can recharge their e-purses at 600 reloading machines and 500 ATMs. As well as proven and secure dual interface technology, operating in both contact and contactless mode. The card is loaded by either its contact or contactless interface. This allows many recharging possibilities including at bank terminals, bus stations or, with a PC and card reader, over the Internet—and this also permits electronic purchasing via the Internet.

The use of this transponder as a component of the pen-based verification system of the present invention enables the transponder to be compatible with both card-based and cardless systems. In the card-based system, the device is swiped through a cardreader at the POS terminal—and the customer signs her name using the fingerprint stylus. The reference fingerprint image is stored in the smart card/transponder device, which is also where the matching of the sensed print (from the pen) is compared with the reference fingerprint image. This embodiment enabling compatibility with both cardreaders and transponders also is key in enabling a transition to a cardless system.

FIGS. 8A, 8B, and 8C disclose a simplified logic diagram for a similar system of registering (FIG. 8A), making a purchase at a POS terminal (FIG. 8B), and converting from a card-based system to this pen-based and cardless system (FIG. 8C) for an existing customer. The existing customer has a conventional bank account and a card that has been issued with the customer's reference fingerprint stored therein. This embodiment uses a registration processor, a print processor, and an account processor for providing improved protection for access to fingerprint data of the customer. This system provides somewhat improved privacy for the customer, since the processor that compares the fingerprints is not the same processor that has access to the customer's account. This embodiment enables the customer to submit an identifier at a POS terminal (other than the account record number).

Figure 9A:
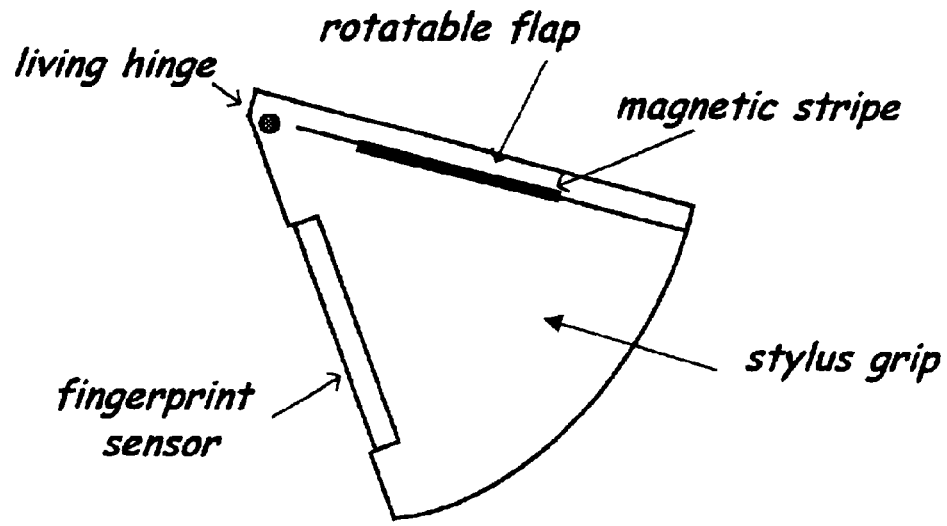
FIGS. 9A and 9B disclose a first preferred embodiment of a stylus grip for use with the identity authentication system of the present invention, the stylus grip having a rotatable flap that includes a magnetic stripe that can be read by a conventional card reader.
Figure 9B:
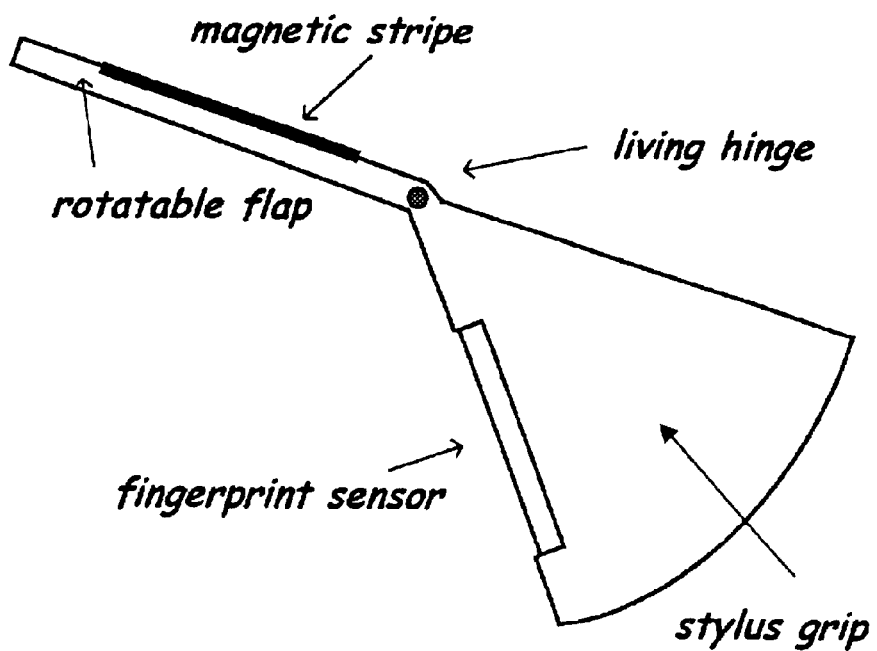

FIG. 9A discloses a simplified logic diagram for another method of registering an existing customer having a conventional bank account into a second embodiment of the pen-based (and cardless) customer identity verification system of the present invention—utilizing a registration processor, a print processor, and an account processor for providing improved protection for access to fingerprint data of the customer. FIG. 9B discloses a simplified logic diagram for another method of making a purchase at a POS terminal using the cardless customer identity verification system of the present invention. FIG. 9C discloses a simplified logic diagram for another method of converting from a card-based identification confirmation system to the pen-based customer identity confirmation system of the present invention.

Figure 11:
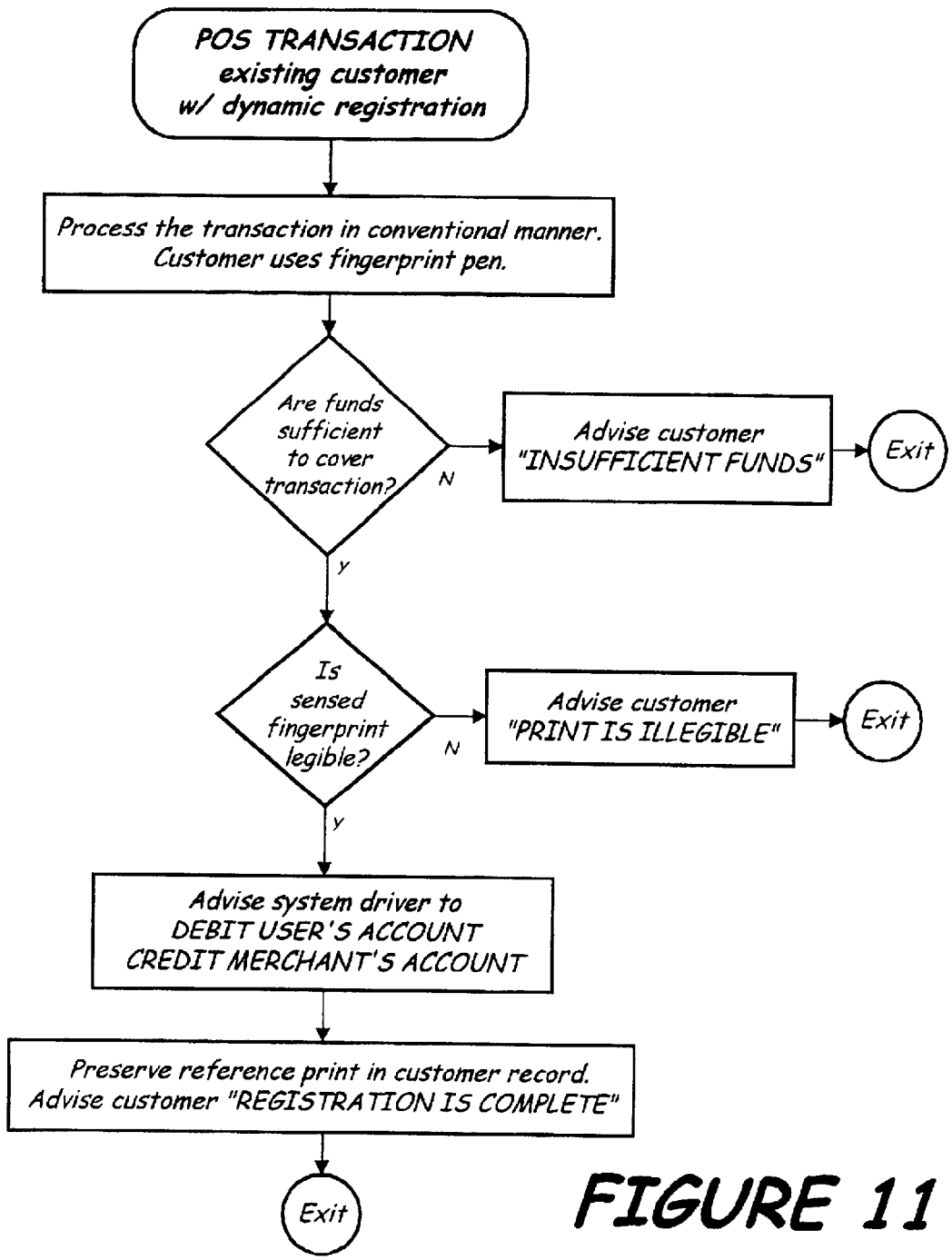
FIG. 11 discloses yet another simplified logic diagram enabling an existing customer using a conventional credit card or transponder to register a reference fingerprint in her customer record during the processing of a conventional POS transaction where the stylus with the fingerprint sensor is used.

Existing customers can use a "dynamic registration" during a routine transaction. A fingerprint is captured during a routine commercial transaction (see FIG. 11), using the stylus with a fingerprint sensor. Thereafter, during a commercial transaction, the sensed print is compared to the reference print as part of the identity verification process whenever the card is submitted through a cardreader. Similarly, if a transponder is used, perhaps to buy gasoline and other items in a convenience store affiliated with the gas station, the pen captures the fingerprint and uses it as a reference print. If the reference print is stored in the customer record (rather than the card or transponder), minimal additional memory is required in the card or transponder for the dynamic registration.

If the bank uses smart cards or smart transponders for such purposes (or a magnetic stripe card with sufficient storage capacity), "dynamic registration, as described above can also result in the reference print being placed on the card or transponder during routine usage for existing customers.

The systems of the present invention are also useful in any hotel to improve security involving on-site charging to a room. The principles of this invention are applicable to controlled environments other than resorts, hotel-casinos, hotels, and casinos. As used herein, unless the context suggests otherwise, a controlled environment is a community of people that: (1) requires registration to become a part of the community; and (2) where the purchase of goods or services occurs. Some examples of controlled environments include: hotels-resorts, luxury cruise liners, airports, banks, racetracks, bowling alleys, theme parks, hospitals, college campuses and public/private schools, military bases, hotel-casinos, sports complexes, shopping malls, and prisons. Once enrolled into the cardless transaction system of the present invention, any guest upon registration with the hotel complex has full and complete access to any amenity within the complex, at anytime, without carrying on his/her user anything other than biometric identification that is inherent in his/her being. As used herein a "controlled environment" does not require a single physical structure, but rather also includes a network of related activities administered by a centralized driver. Some examples of these type controlled environments include a bank and its customers, a regional of drugstores, health club facilities, restaurants, or beauty salons and their customers.

Figure 1B:
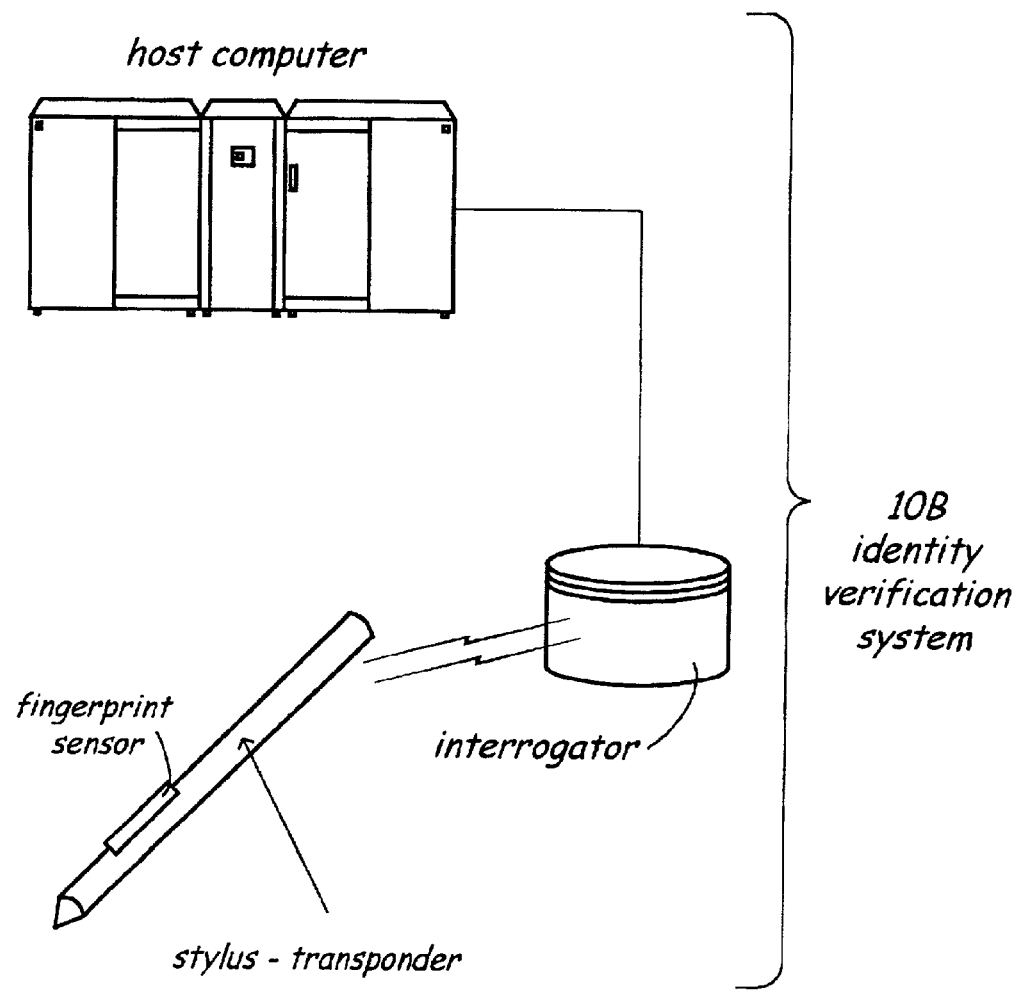
FIG. 1B discloses the identity authentication system of the present invention, comprising an interrogator, a wireless stylus that serves as the transponder, and a host computer.
Figure 1C:
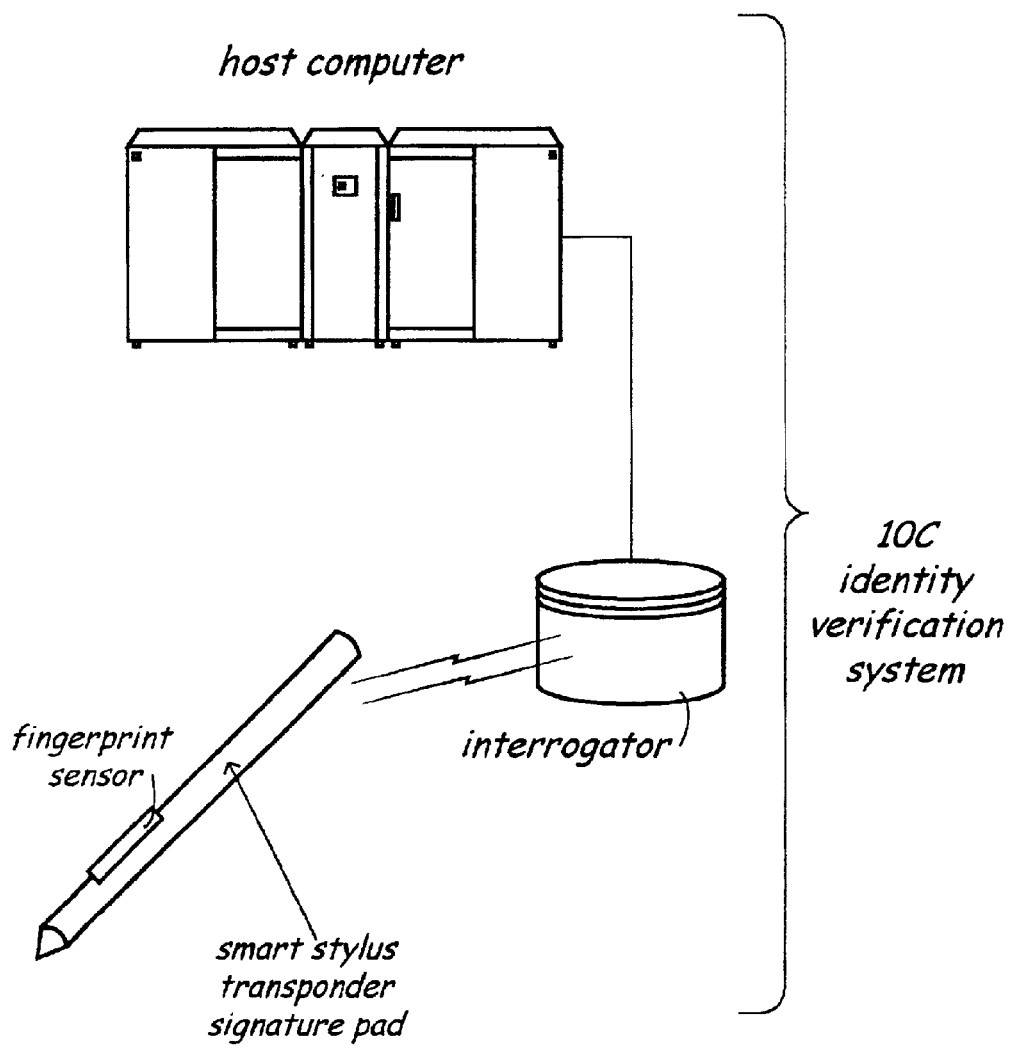
FIG. 1C discloses the identity authentication system of the present invention, comprising an interrogator, a wireless stylus that has enhanced memory, and a host computer.
Figure 8:
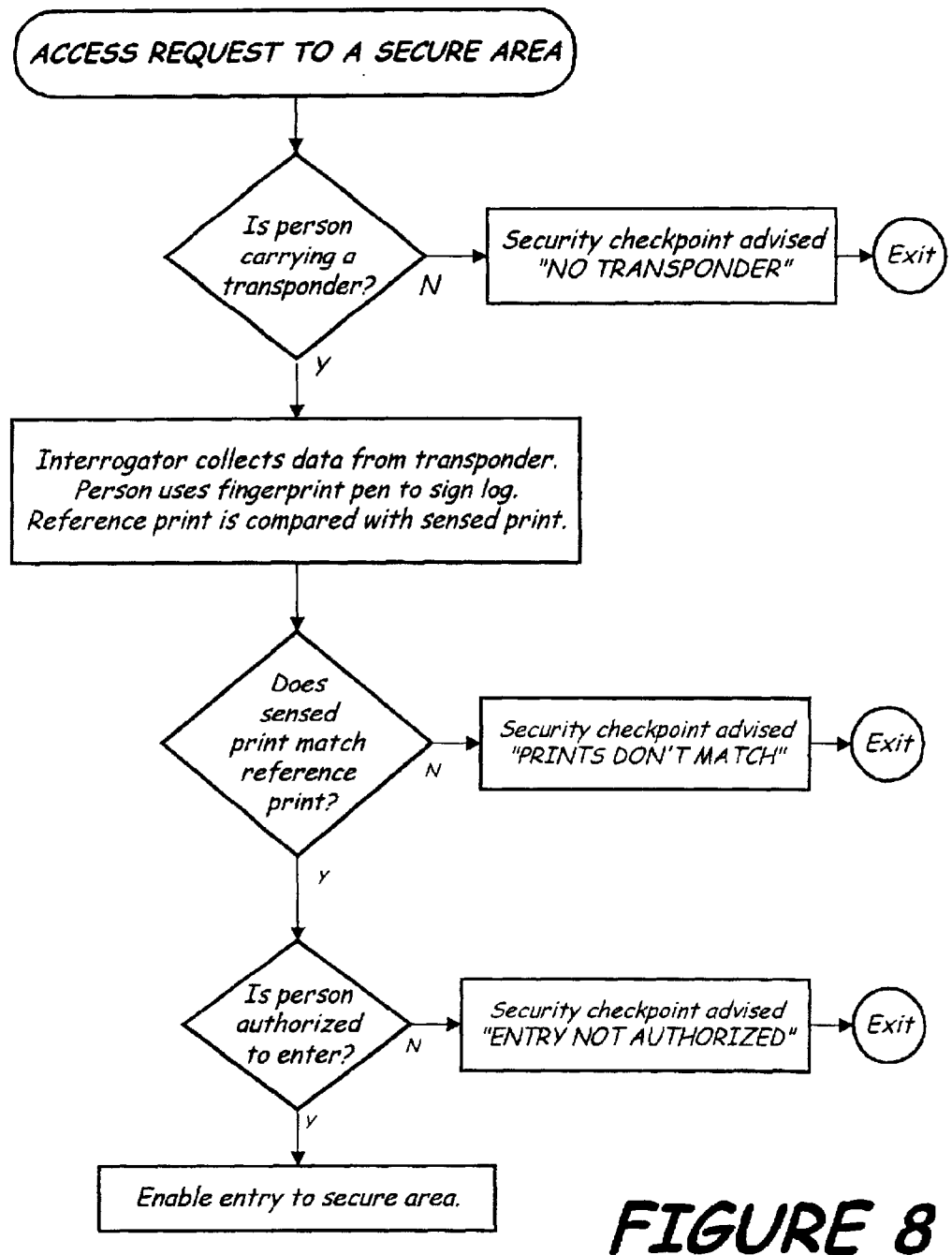
FIG. 8 discloses a simplified block diagram for using the identity verification system of the present invention as shown in FIGS. 1A, 1B, or 1C for securing access to a restricted area.

FIG. 8 discloses a simplified block diagram for using the identity verification system of the present invention as shown in FIGS. 1A, 1B, or 1C for securing access to a restricted area. Sometimes a written log of entry and egress are required for secure areas. If access is limited to employees or to persons to whom a transponder has been issued, the identity authentication system of the present invention provides a seamless way to confirm the identity of those persons entering through the security checkpoint.

Figure 10B:
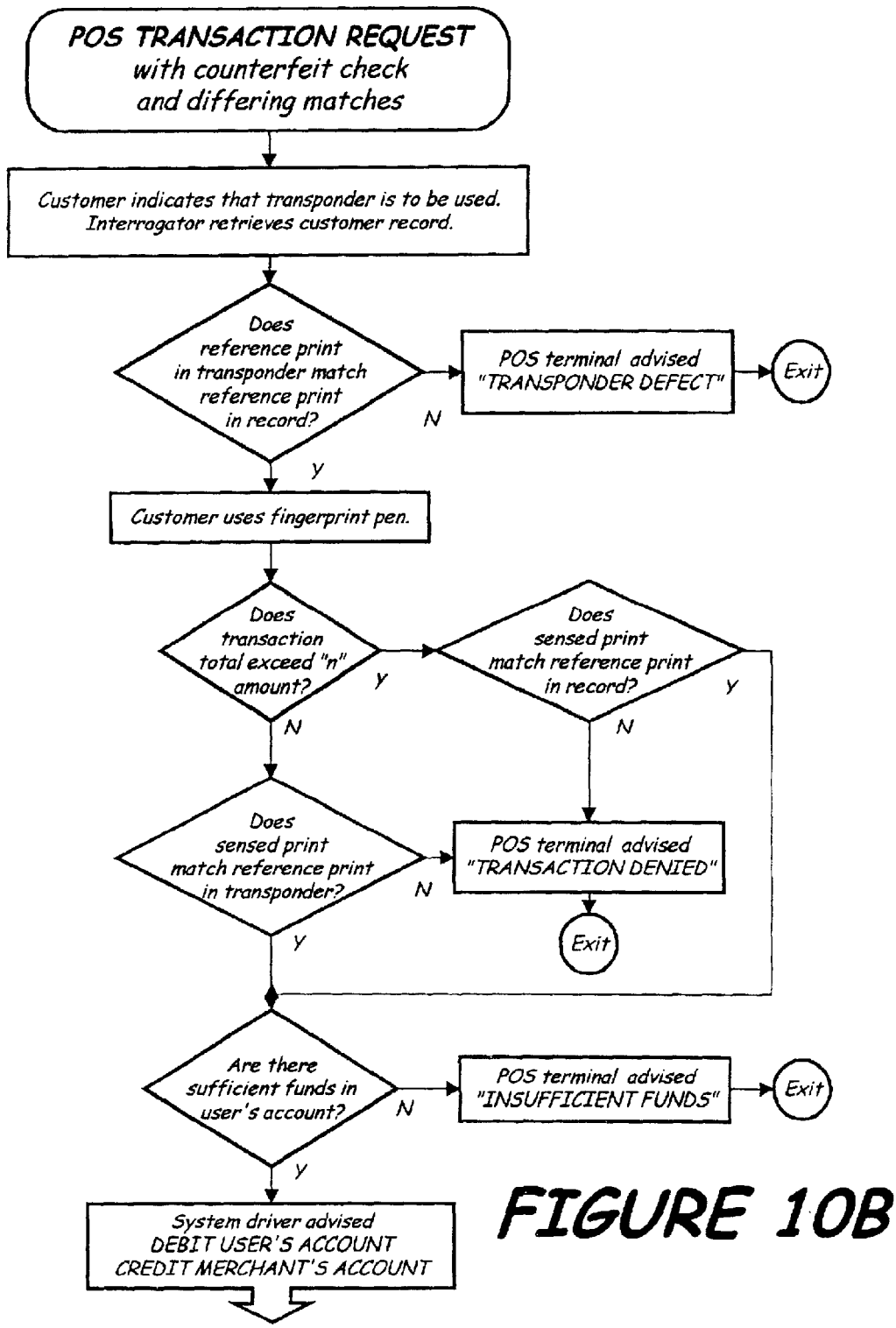
FIG. 10B discloses another simplified logic diagram for making a purchase at a POS terminal using the wireless customer identity verification system of FIG. 5, the method including a check to confirm that the transponder is not a counterfeit or has been tampered with and also using a different referent reference print based upon the total amount of the transaction.

The preferred embodiment of the identity verification system of the present invention is compatible with the following systems:

Fingerprint sensor in something other than pen (card reader, POS counter, card)
Stylus w/fingerprint sensors attached to POS
 Credit cards
 Stored value, ATM, check cards
 Reference print, Bank, and Account number in card, keytag, or wallet
 Bank and Account number in card, keytag or wallet
 Personal identifier in card, keytag, or wallet
Smart-Pen w/fingerprint sensors attached to POS
 Credit cards
 Stored value, ATM, check cards
 Reference print, Bank, and Account number in card, keytag, or wallet
 Bank and Account number in card, keytag or wallet
 Personal identifier in card, keytag, or wallet
Wireless Smart-Pen w/fingerprint sensors carried by payee
 Reference print, Bank, and Account number in smart-pen
 Bank and Account number in smart-pen
 Personal identifier in smart-pen When wireless devices are used, system security becomes even more of a concern, since an integral part of the system, in this instance the transponder, is not attached to the system, but rather is portable and carried by a customer. FIG. 10 discloses a novel method of confirming that the fingerprint on the transponder has not been tampered with. The reference print is stored in both the transponder and the customer record. During a request for a POS transaction, a comparison of the reference print on the transponder with the reference print in the customer record is one way of identifying transponders that have been altered and counterfeit transponders. There are other ways. When the reference print is stored inside a transponder that is carried by the customer, either of the following technologies may also be employed:

U.S. Pat. No. 5,619,025 (Hickman, et al.) discloses a method for tamper-proof identification using photo refractive crystals. The method for document authentication exploits a temporally variable physical process to generate a reproducible effect that cannot be copied. A document such as a credit card is provided with a spot or stripe that incorporates at least one, and preferably a large plurality of photo refractive crystals arrayed in a random manner. The document authenticating apparatus includes a coherent light source such as a diode laser to illuminate the photo refractive crystals, and a photosensor to receive light scattered from the photo refractive crystals. The random distribution and orientation of photo refractive crystals comprises a unique characteristic for each card or document, and this characteristic is not based on any assigned number or code. The response of photo refractive crystals to the coherent illumination comprises a time-varying characteristic that is dependent upon the intensity and temporal nature of the illumination itself. Input to the laser illuminator may be varied to elicit differing responses from the photo refractive crystals, and this factor may be very difficult for a counterfeiter to ascertain. Also, for any given illumination intensity or temporal pattern, the image received by the photosensor varies with time. The time at which the photosensor signal is sampled to obtain an identifying image may also be varied, thereby further compounding the difficulty for a counterfeiter to overcome. A large number of "snapshots" of the time-varying image of the document is electronically captured, digitized, and stored in an electronic media. The photosensor signal is compared to the stored data; a match indicates a valid document, and no match indicates an invalid or unauthorized document. The image recognition process can be enhanced by comparing the rate of change in a sequence of images elicited by the laser illuminator.

U.S. Pat. No. 5,834,748 (Litman) discloses a card that includes magnetic particles and is difficult to counterfeit. The signal strength, period, amplitude and/or alignment of the magnetic field may be read as coded information by a magnetic reading head. The encoding of this information can be made increasingly difficult to imitate or forge by varying parameters within these (and other) mechanically readable inscriptions. The apparatus readable (mechanically readable) security means to prevent forgery of identification cards, (including the new smart cards with readable chips therein) and pens. The security of the pens is enhanced by the implementation of a mechanically readable security system, which includes a mechanically readable magnetic marking embedded in the transactional item. The marking also may be visually notable or readable, but it at least must be readable by a reading head capable of reading the passage of a magnetic material by the head. The marking is preferably in the form of at least two magnetic filaments or strips and preferably includes a multiple number of filaments of differing coerciveness, magnetic field strength, magnetic field alignment, size or spacing so that when the pen is passed at a defined and preferably constant speed through the reading device, approval will be given only when the proper signal is provided by the ordered array of appropriate magnetic elements in the pen.

Registration can also occur without the pen, but rather with a fingerprint that captures essentially a complete fingerprint of the finger for references purposes. Subsequently, when the pen is used, the partial print is compared to the complete fingerprint for matching purposes.

Just as a transponder that is compatible with existing cardreaders enables the system of the present invention to be compatible with card-based systems and pen-based (cardless) systems as shown above, utilization of a pen that is compatible with existing cardreaders offers many similar advantages for a wireless stylus, that is compatible with card-based systems and pen-based systems. FIGS. 9A and 9B disclose a first preferred embodiment of a stylus grip for use with the identity authentication system of the present invention, the grip having a rotatable flap that includes a magnetic stripe that can be read by a conventional card reader. FIGS. 9C and 9D disclose a second preferred embodiment of a stylus for use with the identity authentication system of the present invention, the stylus being unfoldable into a card-shaped device that includes a magnetic stripe that can be read by a conventional card reader, the device being compatible for carrying in the wallet of a customer.

Employing the pen-based systems of the present invention will be initially implemented in controlled environments, generally where registration occurs on-site using the stylus with the fingerprint sensors—for example, a hotel or resort. The principles of this invention are applicable to controlled environments other than resorts, and hotels. As used herein, unless the context suggests otherwise, a controlled environment is a community of people that: (1) requires registration to become a part of the community; and (2) where the purchase of goods or services occurs. Some examples of controlled environments include: hotels-resorts, luxury cruise liners, airports, banks, racetracks, bowling alleys, theme parks, hospitals, college campuses and public/private schools, military bases, hotel-casinos, sports complexes, shopping malls, and prisons. Once enrolled into the cardless transaction system of the present invention, any guest upon registration with the hotel complex has full and complete access to any amenity within the complex, at anytime, without carrying on his/her user anything other than biometric identification that is inherent in his/her being. As used herein a "controlled environment" does not require a single physical structure, but rather includes a network of related activities administered by a centralized driver. Some examples of these type controlled environments include a bank and its customers, a regional of drugstores, health club facilities, restaurants, or beauty salons and their customers.

EXAMPLES INCLUDE hotels-resorts—the key provides access to the guest room and other private suites and for guest tracking while the cash-alternative instrument is used for all on-site purchases.

luxury cruise liners—the key provides access to the guest room while the cash-alternative instrument is used as a method of payment for all on-site purchases.

airports—the key provides access to private clubs for preferred passengers and security access for airport security personnel while the cash-alternative instrument is used as a method of payment for tickets, food, car rentals, etc.

hotel-casinos—the key provides access to the guest room while the cash-alternative instrument is used for all purchases within the complex (particularly useful when chips and cash are not used for gaming—player tracking).

racetracks, bowling alleys, pool halls—key is used for access to the facility and private rooms on site while the cash-alternative instrument is used as a method of payment for on-site purchases.

theme parks—the key provides gate entry and entry to any private facilities within the park while the cash-alternative instrument is used as a method of payment within the park.

hospitals—the key provides access to the patient rooms (private and semi-private) while the cash-alternative instrument is used for purposes of identification for treatment purposes and patient tracking and for purchases. the key can be used by physicians, nurses, and administrative personnel for access to secure areas, parking, access to patient records, and the cash-alternative instrument can be used for on-site purchases.

college campuses and public/private schools—the key provides access to the dorm and individual rooms and classrooms and for purposes of identification while the cash-alternative instrument is used for student aid requests, scholarships, and purchases on campus (cash-alternative instrument also used for identification for medical treatment).

military bases—the key is used for identification for access into the base, secure areas within the base, and individual rooms and tracking while the cash-alternative instrument is used as a method of payment for purchases on-site.

prisons—the key is used for cell access and inmate tracking while the cash-alternative instrument is used as a method of payment on site.

sports complexes—the key provides access to the gate and private suites while the cash-alternative instrument is used as a method of payment within the complex.

shopping malls—the key provides access to the mall and private restaurants/suites and shopper tracking while the cash-alternative instrument is used as a method of payment on-site.

Throughout this application, various U.S. Patents, Patent Applications, and PCT Applications are referenced by number and inventor. The disclosures of these Patents and Applications in their entireties are hereby incorporated by reference into this specification in order to more fully describe the state of the art to which this technology pertains.

It is evident that many alternatives, modifications, and variations of the pen-based transponder identity verification systems of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

What is claimed is:

1. A system for use by a customer to conduct a commercial transaction, the customer being registered and linked with an account for payment, the system comprising:
   a. a host computer having access to data that links the customer with the customer account;
   b. a first electronic device disposed at a point-of-sale terminal, the first electronic device being digitally linked to the host computer;
   c. a second electronic device that is wireless, the wireless device being carried by the customer, the second electronic device communicating with the first electronic device transmitting data therebetween relative to an identity verification, radio frequency transmission being used for data transfer between the first electronic device and the second electronic device; and
   d. a stylus having at least one sensor, the sensor capturing a digital signature of the customer while the stylus is being used;
wherein access to the customer account is enabled when the sensed digital signature matches a reference digital signature.

2. The system of claim 1, wherein the digital signature is a fingerprint.

3. The system of claim 1, wherein the digital signature involves the capture of cells from the customer touching the sensor.

4. The system of claim 1, wherein the reference digital signature is disposed in the wireless device.

5. The system of claim 1, wherein the reference digital signature is disposed in a customer record, the customer record being accessible by the host computer.

6. The system of claim 1, wherein matching of the sensed print with the reference print occurs off-site.

7. The system of claim 1, wherein matching of the sensed print with the reference print occurs at a point-of-sale terminal.

8. A system for use in regulating access to a secure area, the system including at least one pre-registered party who is permitted access to the secure area, the pre-registered party having previously submitted a reference digital signature, the system comprising:
   a. a host computer that has access to data that links the registered party with the reference digital signature;
   b. a first and a second electronic device, the first electronic device being disposed at a security check-point, the second electronic device being wireless, the second electronic device being carried by the customer, the first and second electronic devices being in communication with the host computer, radio frequency transmission being used for data transfer between the first electronic device and the second electronic device; and
   c. a stylus having at least one sensor, the stylus being useful in preserving a log of access to the secure area, the sensor capturing a digital signature of a party during engagement of a finger of the party with the stylus;
wherein access to the secure area is enabled when the sensed digital signature matches the reference digital signature.

9. The system of claim 8, wherein the digital signature is a fingerprint.

10. The system of claim 8, wherein the digital signature involves the capture of cells from the customer touching the sensor.

11. The system of claim 8, wherein the reference digital signature is disposed in memory within the wireless device.

12. The system of claim 8, wherein the reference digital signature is disposed in a customer record, the customer record being accessible through the host computer.

13. The system of claim 8, wherein comparison of the sensed print with the reference print occurs at a point-of-sale terminal.

14. The system of claim 8, wherein comparison of the sensed print with the reference print occurs at the security checkpoint.

15. A method of conducting a commercial transaction for payment at a point-of-sale terminal, the method comprising:
   d. requesting identity verification through cooperative engagement between a first and a second electronic device, the first electronic device being disposed at the point-of-sale terminal, the second electronic device being wireless, the second electronic device being carried by the customer, the first and second electronic devices being in digital communication with a host computer, the host computer having access to data that links at least one registered party to a reference digital signature;
   e. using a stylus to submit written data pertinent to the identity verification, the stylus having a sensor that enables capture of a digital signature of a party during engagement of a finger of the party with the stylus;
   f. transmitting data between the first electronic device and the second electronic device by radio frequency transmission; and
   d. enabling access to the customer account when the sensed digital signature matches the reference digital signature.

16. The method of claim 15, wherein the digital signature is a fingerprint.

17. The method of claim 15, wherein the reference digital signature is disposed in the wireless electronic device.

18. The method of claim 15, wherein the reference digital signature is disposed in a customer record, the customer record being accessible by the host computer.

19. The method of claim 15, wherein matching of the sensed print with the reference print occurs at a point-of-sale terminal.

20. The method of claim 15, wherein matching of the sensed print with the reference print occurs at a point-of-sale terminal.

21. A method of enabling access to a secure area, the method comprising:
   a. requesting identity verification through cooperative engagement between a first and a second electronic device, the first electronic device being disposed at a security checkpoint, the second electronic device being wireless, the second electronic device being carried by the customer, the first and second electronic devices being in digital communication with a host computer, the host computer having access to data that links at least one registered party to a reference digital signature;

b. using a stylus to submit written data pertinent to the identity verification, the stylus having a sensor that enables capture of a digital signature of a party during engagement of a finger of the party with the stylus;

c. transmitting data between the first electronic device and the second electronic device by radio frequency transmission; and d. enabling access to the secure area when the sensed digital signature matches the reference digital signature.

22. The method of claim 21, wherein the digital signature is a fingerprint.

23. The method of claim 21, wherein the reference digital signature is disposed in the wireless device.

24. The method of claim 21, wherein the reference digital signature is disposed in a customer record, the customer record being accessible by the host computer.

25. The method of claim 21, wherein comparison of the sensed print with the reference print occurs at the security checkpoint.

26. A system for use by a customer to conduct a commercial transaction, the customer being registered and linked with an account for payment, the system comprising:

a. a host computer having access to data that links the customer with the customer account;

b. an electronic device disposed at a point-of-sale terminal, the electronic device being digitally linked to the host computer; and c. a stylus that is wireless, the stylus being carried by the customer, a stylus having at least one sensor, the sensor capturing a digital signature of the customer while the stylus is being used, the stylus communicating with the electronic device transmitting data therebetween relative to an identity verification, at least some of the data transmission between the first electronic device to the second electronic device being by radio frequency;

wherein access to the customer account is enabled when the sensed digital signature matches a reference digital signature.

27. The system of claim 26, wherein the digital signature is a fingerprint.

28. The system of claim 26, wherein the digital signature involves the capture of cells from the customer touching the sensor.

29. The system of claim 26, wherein the reference digital signature is disposed in the wireless device.

30. The system of claim 26, wherein reference digital signature is disposed in a customer record, the customer record being accessible by the host computer.

31. The system of claim 26, wherein matching of the sensed print with the reference print occurs at a point-of-sale terminal.

32. The system of claim 26, wherein matching of the sensed print with the reference print occurs at a point-of-sale terminal.

33. A system for use by a customer to conduct a commercial transaction, the customer being registered and digitally linked with an account for payment, the system comprising:

e. a host computer having access to data that links the customer with the customer account;

f. a first electronic device disposed at a point-of-sale terminal, the first electronic device being digitally linked to the host computer;

g. a second electronic device that is wireless, the wireless device being carried by the customer, the second electronic device communicating with the first electronic device transmitting data therebetween relative to an identity verification, radio frequency transmission being used for data transfer between the first electronic device and the second electronic device; and h. a stylus having at least one fingerprint sensor thereon, the sensor being capable of capturing a digital signature of the customer while the stylus is being used;

wherein the stylus is graspable between a thumb and one or more fingers of the customer's hand with an identifying portion of a thumb or finger of the customer contacting said fingerprint sensor, and wherein the stylus has a tip portion configured for marking on a paper or digital surface; and wherein access to the customer account is enabled when the sensed digital signature matches a reference digital signature.

* * * * *